G. A. & J. D. HEYWOOD.
HAND CORN PLANTER.
No. 393,645. Patented Nov. 27, 1888.
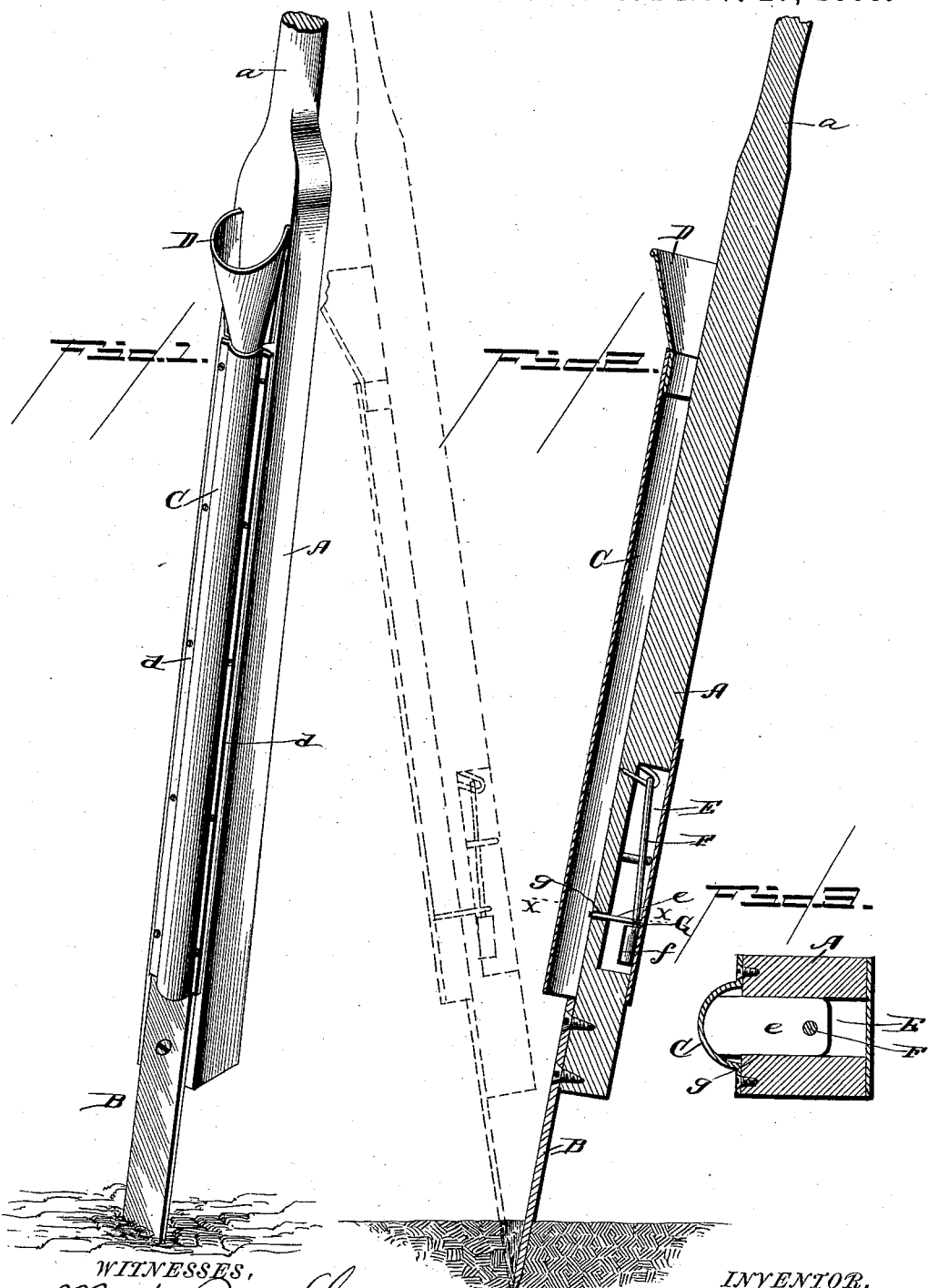
WITNESSES,
INVENTOR,
Gardner A. Heywood,
John D. Heywood,
By R. S. & A. P. Lacey, Attorneys.

UNITED STATES PATENT OFFICE.

GARDNER A. HEYWOOD AND JOHN D. HEYWOOD, OF GORDON, NEBRASKA.

HAND CORN-PLANTER.

SPECIFICATION forming part of Letters Patent No. 393,645, dated November 27, 1888.

Application filed July 25, 1888. Serial No. 281,010. (No model.)

*To all whom it may concern:*

Be it known that we, GARDNER A. HEYWOOD and JOHN D. HEYWOOD, citizens of the United States, residing at Gordon, in the county of Sheridan and State of Nebraska, have invented certain new and useful Improvements in Corn-Planters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to planters, and has for its object the production of a hand-planter that will be simple, cheap, compact, and reliable.

The invention consists of the peculiar construction and combination of the parts, which hereinafter will be more fully described and claimed, and shown in the drawings, in which—

Figure 1 is a perspective view of a hand-planter of our invention; Fig. 2, a central vertical section, parts being broken away, of the planter, showing its operation by dotted lines; and Fig. 3, a cross-section on the line X X of Fig. 2.

The planter staff A is reduced at its upper end and rounded to form the handle a. The blade B, of metal, is straight and has its upper end secured to the staff A and its lower end projecting some distance below the end of the staff and sharpened, so as to readily enter the ground. The grain-tube C, extending from near the top of the staff to near the lower end thereof, is formed of sheet material, preferably metal, which is deflected or bent out between its edges, leaving a margin or wing, d, on each side of the bent portion, by which the tube is secured to the staff by nails or other suitable fastening devices driven through the said wings d into the staff. The hopper D, secured to the staff above the grain-tube, has its upper end made flaring, to permit the ready insertion of the grain.

The recess E in the rear side of the staff, near its lower end, holds the cut-off e and the devices for operating the cut-off, which comprise the rod F, loosely connected at its upper end with the top wall of the said recess, the weight f at the lower end of the rod F, and the guide-rod G, for limiting the movement of the rod and preventing its having any lateral movement. The cut-off works through a slot, g, in the front side of the staff, and is adapted to be projected across the tube C and hold the grain until it is desired to plant it. The rod F passes through the cut-off or is otherwise connected therewith. The parts are so disposed that when the staff A is in a perpendicular position, or approximately so, the weighted rod F will likewise be in an approximately vertical position and hold the cut off or valve e open, and when the staff is inclined toward the person planting the cut-off or valve e will be held closed or projected by reason of the gravity of the weighted rod F.

In practice the person carries the grain in a pouch or bag and drops the desired quantity to be planted in a hill in the hopper D, care being taken to hold the staff inclined to close the valve or cut-off. The blade is forced in the ground, still keeping the staff inclined. When the blade is entered in the ground sufficiently far, the staff is brought to a perpendicular position. This motion increases the width of the opening and at the same time opens the valve and permits the seed to drop in the said opening.

Having thus described our invention, what we claim, and desire to secure by Letters Patent, is—

1. The combination, with the staff having a grain-tube and an opener, of the cut-off and the weighted rod, substantially as and for the purpose described.

2. The combination, with the staff having a grain-tube and an opener and having a recess in its side, of the cut-off, the weighted rod, and the guide, substantially as described.

3. The hereinbefore-described hand-planter, composed of the staff having the recess E, the blade B, the grain-tube C, the hopper D, the cut-off or valve e, and the weighted rod F, substantially as set forth.

In testimony whereof we affix our signatures in presence of two witnesses.

GARDNER A. HEYWOOD.
JOHN D. HEYWOOD.

Witnesses to Gardner A. Heywood's signature:
H. C. BARTE,
ROBERT MCCARTY.

Witnesses to John D. Heywood's signature:
F. C. CHILDS,
WM. GELDER.